Sept. 27, 1938.  L. LOEWENSTEIN  2,131,446
DEVICE FOR MOLDING FROZEN CONFECTIONS
Filed Sept. 12, 1936  3 Sheets-Sheet 2
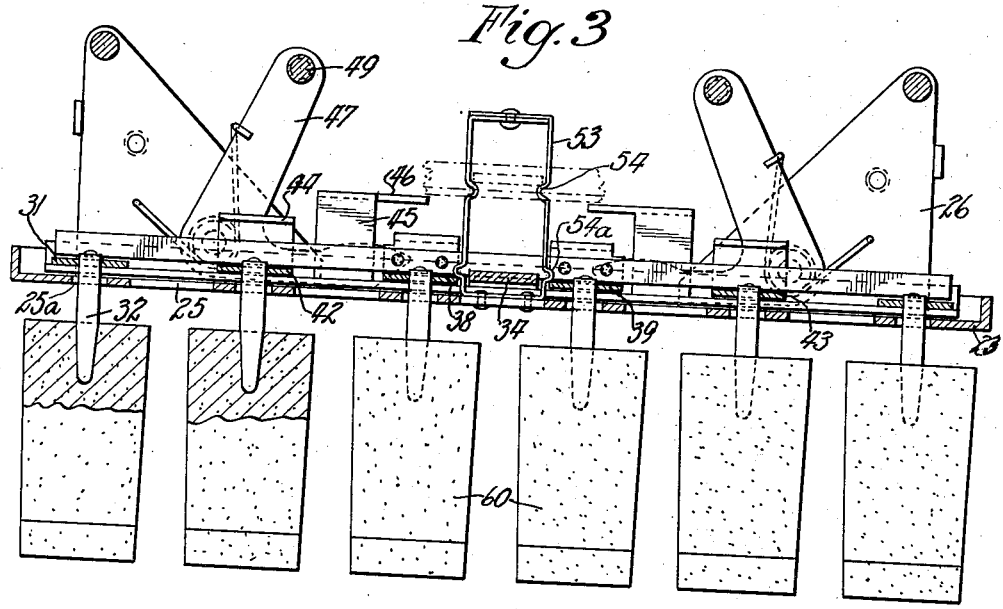
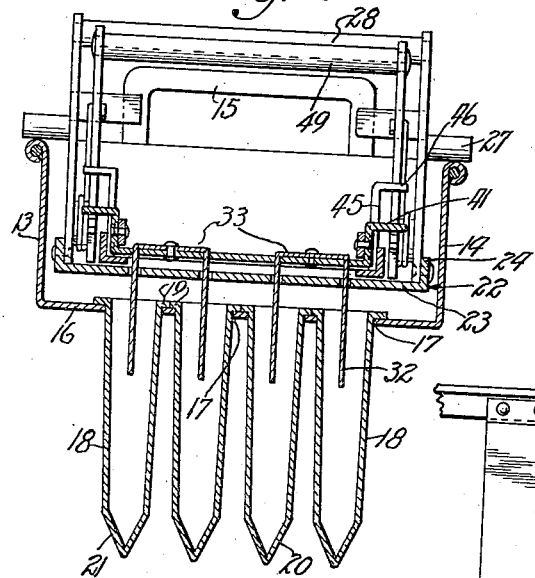
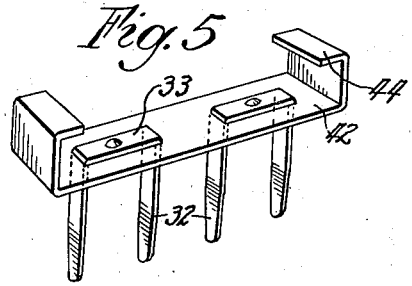
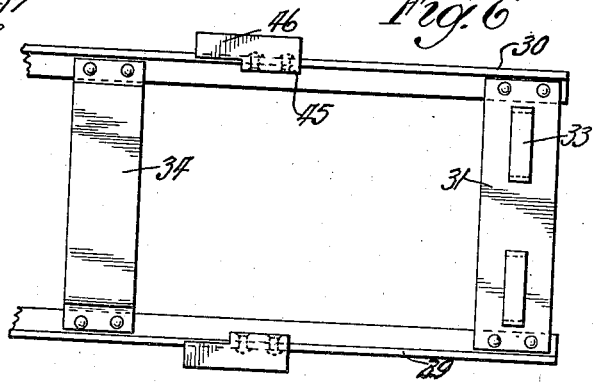
Inventor
Ludwig Loewenstein
by Henry Plech
Attorney.

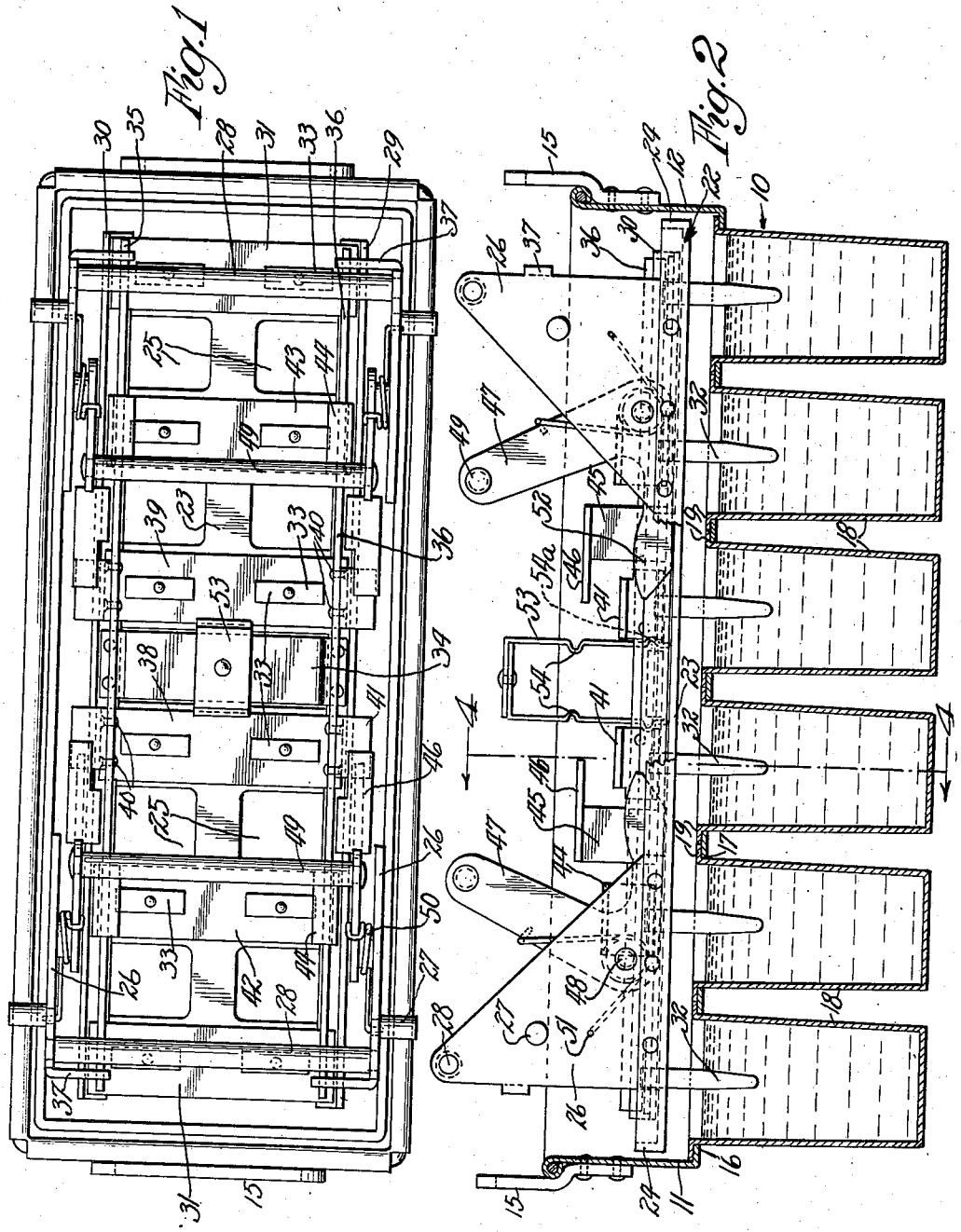

Sept. 27, 1938.　　　L. LOEWENSTEIN　　　2,131,446
DEVICE FOR MOLDING FROZEN CONFECTIONS
Filed Sept. 12, 1936　　　3 Sheets-Sheet 3

Inventor
Ludwig Loewenstein
by Henry Beck
Attorney.

Patented Sept. 27, 1938

2,131,446

UNITED STATES PATENT OFFICE 2,131,446

DEVICE FOR MOLDING FROZEN CONFECTIONS

Ludwig Loewenstein, Chicago, Ill.

Application September 12, 1936, Serial No. 100,422

5 Claims. (Cl. 107—8)

The invention relates to a device particularly adapted for molding frozen confections.

Devices are known wherein a mold with multiple cavities is filled with a semi-solid ice cream mix with a superposed carrier having a pin extending into each cavity so that the congealed confection adheres to the pins. After the bond between the confections and the mold wall is broken, the carrier is removed and the confections are then dipped into a chocolate bath, if desired, and subsequently a stripper on the carrier, when actuated, breaks the bond between the confections and the appertaining pins.

In making molded confections in quantities, it has been found to be preferable to mold confections in dozens, but a device for producing two dozens at one time has been found most satisfactory to the industry as meeting the requirements of commercial production and wear and tear on the device.

In the known apparatus the confections have been stripped from the carrier in a single operation, causing thereby the device to be subjected to great strain and to become warped and bent after short use.

It, therefore, constitutes the principal object of the invention to provide means for successively breaking the bond between the confection and pins so that a greatly reduced force is applied during the stripping action.

A further object aims at providing a sectionalized stripper device, each section being actuated in timed relation so that successive stripping is provided, necessitating only a fraction of the force as compared with simultaneous stripping of all of the confection at one time.

It is a still further object to mount the rods or pins movable on the carrier, and actuating said rods in a predetermined order.

With these and other equally important objects in view, which will become apparent from a perusal of the invention, the latter comprises the means described in the following specification, particularly pointed out in the claims forming a part thereof, and illustrated in the accompanying drawings, in which:

Fig. 1 is a top plan view of the device constructed in accordance with my invention.

Fig. 2 is a side view with parts being shown in section.

Fig. 3 is a longitudinal section through the carrier and stripping means with the congealed confections adhering to the pins.

Fig. 4 is a section on the line 4—4 of Fig. 2.

Fig. 5 is a perspective view of a detail.

Fig. 6 is a fragmentary top plan view of the stripper plate, with parts omitted for clarity.

Figure 7:
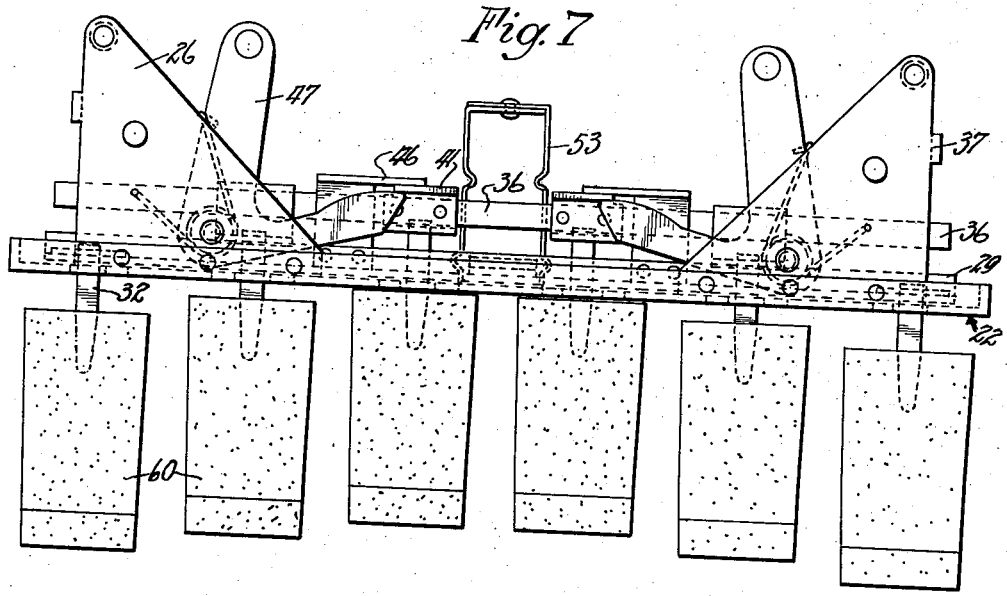
Fig. 7 is a side view of the carrier and the stripper plate in partially raised position.

Referring to the several views in the drawings, the mold generally designated by 10 forms a box like structure of rectangular cross section having end walls 11 and 12 and side walls 13 and 14. Handles 15 are riveted or otherwise secured to the end walls for facilitating lifting or lowering of the mold, such as becomes necessary in connection with freezing in a brine tank.

The bottom 16 is provided with openings 17, there being six rows of four openings in each row and the rows of openings are parallel to the end walls.

It has been empirically established that the device operates most satisfactorily with twenty four confections, but a larger or lesser number may be selected, if preferred.

In each opening is suspended a container 18 which, at the upper end rests with a flange 19 on the edge adjacent to the opening 17. (Fig. 2.)

The containers are tapered toward the bottom and at the lower end are beveled as at 20 and 21 (Fig. 4), so that the confections 60, when removed from the containers, terminate at the bottom in a sharp line. Any other shape may be selected.

Cooperating with the mold box 10 is a carrier which is adapted to be received in the box and held in position so that pins or rods, later to be described, project into the containers for having the confections congeal on said rods.

The carrier generally designated by 22 comprises a rectangular plate 23 which, throughout its perimeter, has an upstanding flange 24 and is also provided with large openings 25 to afford inspection of the freezing process occurring in the containers 18.

The carrier plate has triangular upstanding bearing plates 26 near each end, from each of which extend laterally a horizontal pin or stud 27, adapted to contact with the upper edge of the box 10 to limit the extent to which the carrier may be lowered into the mold.

Brace rods 28 connect the bearing plates at each end of the carrier.

The pin frame is made up in sections one of which comprises two longitudinal angle irons 29, 30 which are connected at the ends by a cross bar 31, which is provided with spaced slots to receive downwardly projecting pins or rods 32 of a U member 33 riveted to the cross bar or otherwise secured thereto.

At the center of the frame, a cross bar 34 is connected to the angle irons 29, 30, which are slightly shorter than the length of the carrier plate 22.

Inwardly of the angle irons, and parallel thereto, are longitudinal bars 35, 36, which extend slightly beyond the outer end of the bearing plates 26, and are adapted to be limited in the upward movement by stops 37 formed as integral flanges of the bearing plates 26.

Figure 9:
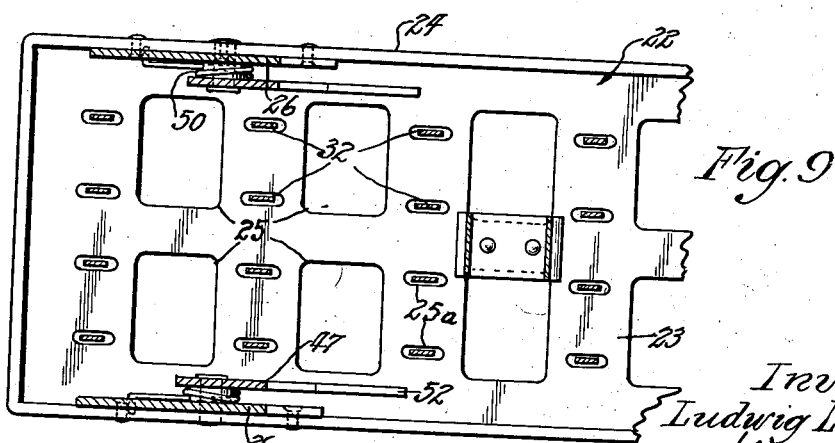
Fig. 9 is a fragmentary horizontal section on the line 9—9 of Fig. 8.

The bars 35 and 36 are connected by cross members 38, 39, one at each side of the cross bar 34 and secured to the bars 35, 36 by rivets 40, and each member is provided with a pair of U-members 33 in aligned relation, so that the pins 32 extend into the container 18, as will be readily seen by reference to Fig. 2, the plate 22 having slots 25a for the passage of the pins (Fig. 9).

The longitudinal bars 35, 36, together with the cross members 38, 39, constitute a frame for the eight center pins 32.

The cross members 38, 39 are formed with overhanging horizontal flanges 41 for a purpose hereinafter described.

Additional cross members 42, 43, constituting frames to which U-members 33, are secured with downwardly projecting pins 32, are bent at right angles at the ends and extend into horizontal flanges 44 (Fig. 5) overlying the bars 35, 36.

To the angle irons are secured vertical plates 45 which are provided with outwardly extending horizontal flanges 46 overlying the flanges 41. The flanges 44 are in a plane midway between the flanges 41 and 46.

To the bearing plates 26 is pivotally secured, as at 48, a bell crank lever 47 which, at the upper end, is connected to the companion lever by a handle bar 49.

The lever 47 has wound around its pivot a coiled spring 50, anchored at one end to the bearing plate 26, as at 51, and engaging the lever 47 so that the lower leg 52 is in downward position.

Any other spring means may be employed, if desired.

In use, the parts are originally in the position shown in Fig. 2. After the bond between the confections and the mold walls are broken, the carrier is lifted by the handles 28 and, if desired, the confections adhering to the pins 32 are dipped in a chocolate bath. Then the levers 47 are turned outwardly against the action of the springs 50, by drawing handles 28 and 49 toward each other, whereby the lever leg 52 engages the flanges 41, causing a lifting of the bars 38, 39, together with the longitudinal bars 35, 36, whereby eight confections are elevated. The latter, in their upward movement, engage the flanges 44, causing lifting of the cross bars 42, 43 so that eight additional confections are elevated.

In the continued movement of the levers 47, the flanges 41 engage the flanges 46, whereby the angle irons 29, 30 and the cross bars 31 are lifted, causing the elevation of the remaining eight confections.

The timed elevating of the confections, as shown, causes them in series of eight to be pressed against plate 23, thereby successively breaking the bond between the confections and the pins.

Figure 8:
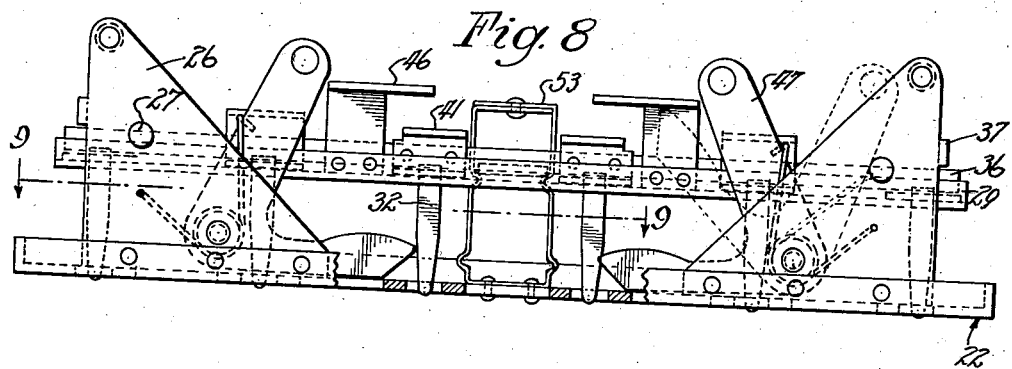
Fig. 8 is a view similar to Fig. 7 with the stripper plate in final position.

The cross bar 34 travels in a bail member 53, which is secured to the plate 23 and is provided with abutments 54. The cross bar 34, due to the spring action of the bail member 53, passes the abutments 54 in its upward movement, and is held against descent, as shown in Fig. 8.

Continued upward movement of the stripper is prevented by engagement of the bars 35, 36 with the stops 37 of the bearing plates as previously mentioned.

To return the stripper to normal position, downward pressure is exerted preferably on the cross bars 31 to force the cross bar 34 past the abutments 54. Likewise abutments 54a prevent movement in reverse direction if device is inverted. Any spring lock may be used in lieu of bail 53.

It will readily be understood that the stripping is obtained in three stages involving, first, the center eight pins, then the adjacent eight, and finally, the remaining eight pins on the bars 31. Accordingly, one third of the pressure is applied to remove the confection, as compared with the pressure necessary where all of the confections are stripped simultaneously.

The removal of the confections in stages, at timed intervals, will make the stripping action more accurate and reliable and, in addition, the wear and tear on the device will be greatly lessened, so as to prolong the life thereof.

While the drawings show a preferred embodiment of the invention, numerous changes and alterations may be made without departing from the spirit thereof.

I, therefore, do not limit myself to details of construction and arrangement, as shown, but claim my invention as broadly as the state of the art permits.

I claim:

1. In a confection making apparatus having a mold with a plurality of cavities for receiving the confection material, a removable portable carrier adapted to be supported above said mold cavities, a sectional frame on said carrier rods depending from each section of said frame into each mold cavity to which the confections congeal, and means for independently actuating each section for successively stripping said confections from said rods when the carrier is removed from the mold cavities.

2. In a confection making apparatus having a multi-cavity mold, a removable carrier on said mold, a plurality of frames movable on said carrier, rods mounted on said frames and extending through slots in said carrier into each mold cavity, and resilient means for holding said frame in raised position to clear the rods from said mold cavities.

3. A carrier for molded confections, including a plate, a plurality of frames on said plate, rods mounted on and projecting from said frame through slots in said plate, and means for independently actuating each frame section to cause timed relative movement between said rods and said plate.

4. A carrier for molded confections, including a plate, a plurality of frames on said plate, rods projecting from said frames through slots in said plate, and means for successively shifting said rods relative to said plate.

5. A carrier for molded confections, including a plate, a plurality of frames movably supported on said plate, rods projecting from said frames through slots in said plate, means for successively actuating said frames to cause recession of said rods, and means for releasably locking said frames in lowermost and topmost positions respectively.

LUDWIG LOEWENSTEIN.